Sept. 20, 1960 J. H. BEESLEY 2,953,749

ELECTRIC CIRCUIT ARRANGEMENTS FOR GENERATING TRAINS OF ELECTRIC PULSES

Filed Nov. 30, 1954 5 Sheets-Sheet 1

INVENTOR
John Henry Beesley
BY
ATTORNEY

Sept. 20, 1960 J. H. BEESLEY 2,953,749

ELECTRIC CIRCUIT ARRANGEMENTS FOR GENERATING TRAINS OF ELECTRIC PULSES

Filed Nov. 30, 1954 5 Sheets-Sheet 2

INVENTOR
John Henry Beesley
BY
[signature]
ATTORNEY

INVENTOR
JOHN HENRY BEESLEY
BY
ATTORNEY

INVENTOR
John Henry Beesley
BY
[signature]
ATTORNEY

Sept. 20, 1960 J. H. BEESLEY 2,953,749

ELECTRIC CIRCUIT ARRANGEMENTS FOR GENERATING TRAINS OF ELECTRIC PULSES

Filed Nov. 30, 1954 5 Sheets-Sheet 5

INVENTOR
John Henry Beesley
BY
[signature]
ATTORNEY

United States Patent Office 2,953,749

Patented Sept. 20, 1960

2,953,749

ELECTRIC CIRCUIT ARRANGEMENTS FOR GENERATING TRAINS OF ELECTRIC PULSES

John Henry Beesley, Coventry, England, assignor to The General Electric Company Limited, London, England Filed Nov. 30, 1954, Ser. No. 472,090

Claims priority, application Great Britain Dec. 4, 1953

16 Claims. (Cl. 328—95)

The present invention relates to electric circuit arrangements for generating trains of electric pulses, and is particularly concerned with electric circuit arrangements for generating at selected ones of a plurality of output terminals selected ones of a plurality of time-interlaced pulse trains, each selected pulse train being determined by the phase of a control pulse. By time-interlaced pulse trains is meant electric pulse trains having a common pulse repetition frequency, the durations of the pulses in the trains and the phase relationship between the pulses in different trains being such that none of the pulses in the trains coincide.

Such a plurality of time-interlaced pulse trains may serve as speech channels in a multiplex telecommunications system. For example, an automatic telephone system has been proposed in which a large plurality of subscribers' line terminating units are connected by means of a common transmission link to a relatively small plurality of trunk terminating units, each of the line and trunk terminating units incorporating a modulator and a receiver adjustable selectively to transmit to the link and receive from the link signals in any one of a plurality of different channels. The channels in the proposed system are in the form of 100 time-interlaced trains of ½ μsec. pulses. The pulses in each train have a pulse repetition period of 100 μsecs. and the trains are interlaced in such a way that none of the pulses in the trains coincide. Speech and other signals are transmitted between any subscribers' line terminating unit and a free trunk terminating unit as an amplitude-modulation of a selected pulse train. In the proposed system, as many as 500 subscribers are served by 100 channels.

The trunk terminating units referred to are connected together in pairs such that the output circuit of the receiver in each trunk terminating unit in a pair is connected to the input circuit of the modulator in the other trunk terminating unit in the pair, and control apparatus is provided for adjusting the modulators and receivers so as to establish speech channel paths in the link between the calling and called subscribers' line terminating units, the arrangement being such that in each path set up speech signals are transmitted in one of the channels between the calling subscribers' line terminating and one of a free pair of trunk terminating units, and in another of the channels between the called subscriber's line terminating unit and the other of the pair of trunk terminating units. Each terminating unit in the proposed system incorporates a channel pulse generator adapted, in operation, to generate at an output terminal thereof a continuous train of ½ μsec. pulses in the same phase as that of a control pulse applied thereto and the pulse train so generated is fed to the associated modulator and receiver of the unit.

The control apparatus provided comprises means for generating control pulses in the phases of free-channels i.e. channels not already in use for another call, and for applying a control pulse to the generator associated with the selected terminating unit.

There has been proposed, a system serving 10,000 subscribers and incorporating 20 links each serving 500 subscribers, and for this system as many as 14,200 channel pulse generators are required, 10,000 for line terminating units and 4,200 for trunk terminating units.

It will readily become apparent that the provision of such large numbers of identical generators which are in use for only short periods is uneconomical and it is the principal object of this invention to provide circuit arrangements in which the generators share the use of common equipment.

According to the present invention, there is provided an electric circuit arrangement for generating at selected ones of a plurality of output terminals selected ones of a plurality of time-interlaced pulse trains each selected pulse train being determined by the phase of a control pulse, the arrangement comprising a lesser plurality of delay devices than output terminals, different combinations of the delay devices being connected to different ones of a plurality of gate devices having outputs connected to the said output terminals respectively, and means for applying the said control pulse to cause pulses of like phase to circulate continuously around a plurality of loop circuits respectively, the loop circuits comprising the delay devices in the combination associated with the selected output terminal and circuits connecting the outputs of the delay devices with their respective inputs, the gate devices being arranged in such a manner that, in normal operation, a pulse appears in the output of each only when pulses are applied simultaneously to the input circuit thereof from all the delay devices in the combination associated with the gate device. By a plurality of output terminals is meant at least 10. By normal operation is meant operation other than special operation such as starting under the action of a control pulse. The circuit arrangement preferably also includes means for inhibiting the circulation of pulses in response to an inhibiting signal.

The circuit arrangement according to this invention can be employed in the proposed automatic telephone system hereinbefore referred to. One gate device and its associated output terminal is then provided in each of the 500 line terminating units and the delay devices form common equipment shared by all the 500 line terminating units. Thus a substantial economy in apparatus can be effected.

In one arrangement according to this invention each combination of delay devices comprises three delay devices. The delay devices may be in groups, the number of groups being equal to the number of delay devices in each combination and each combination then comprises one delay device from each group. Alternatively, the delay devices are in two groups and each combination comprises one delay device from one of the groups and a sub-combination of two delay devices from the other group.

According to a feature of the invention the circuits connecting the outputs of the delay devices to their respective inputs comprise a connection from each delay device to an input of each of the gate devices associated with the delay device, and a connection from an output of each of the gate devices to the inputs of the delay devices associated therewith. Pulse circulation may then be set up by applying the control pulse of selected phase into the output circuit of the gate device associated with the selected output terminal.

One disadvantage of setting up pulse circulation in this manner is that, when the circuit arrangement is employed in the aforesaid proposed automatic telephone system there is always a risk of two or more subscribers' line terminating units being rendered operative to receive the control pulse simultaneously, and as a result being allotted the same channel.

According to a further feature of the present invention which aims at reducing the aforesaid risk, pulse circulation is set up by applying control pulses in recurring succession to the inputs or outputs of the delay devices in each of the groups, except one, in such a manner that control pulses appear simultaneously in the last-mentioned inputs or outputs of only one sub-combination of delay devices at a time and applying a control voltage to an input of the gate device associated with the selected output terminal, the last said input being associated with a delay device in the said excepted group.

It will be appreciated that only partial protection against the aforesaid risk is afforded by such an arrangement. The risk remaining is that two or more subscribers' line terminating units associated with the same sub-combination of delay devices will be allotted the same channel when simultaneously rendered operative by the application of control voltages.

According to another feature of the invention, the aforesaid risk is eliminated by providing inhibiting means for inhibiting circulation of pulses which appear in the same phase in the inputs or outputs of two or more of the delay devices of the said excepted group. In a preferred arrangement the last-mentioned inhibiting means comprises a two-gate hereinafter defined having inputs connected to points in the last said inputs, or outputs, of the delay devices respectively and a further gate in each of the last-mentioned inputs or outputs each of the further gates being responsive to an output pulse from the two-gate to inhibit further circulation of pulses of the same phase as that of the output pulse from the two-gate.

By two-gate is meant an electric circuit having at least two inputs and an output and being adapted to produce an output pulse only when pulses are simultaneously applied to any two of its inputs.

The two-gate may, in addition in the proposed arrangement, be adapted to serve as the inhibiting means earlier referred to by the provision of a further input, to which pulses in the same phase as those whose circulation is to be inhibited are applied.

For the purposes of the description which follows, a one-gate is to be taken to mean an electric circuit having two or more inputs and at least one output, the circuit being adapted to produce an output pulse in response to the application of a pulse to any one of its inputs. A three-gate is a circuit having three or more inputs and at least one output, the circuit being adapted to produce an output pulse only when pulses are simultaneously applied to any three of its inputs.

It will be apparent, however, that where a two-gate is employed as stated, neither of two subscribers line terminating units simultaneously operative will be allotted a free channel until one is rendered inoperative.

The above disadvantage may however be overcome by providing, instead, a circuit arrangement according to yet another feature of this invention in which each input of the delay devices respectively in the said excepted one of the groups incorporates a two-gate adapted to deliver an output pulse to the input of the delay device in response to the simultaneous application thereto of a pulse in the input lead to the delay device and a pulse applied to another input of the two-gate means for applying control pulses in recurring succession to the last mentioned inputs of the last said two-gates in such a manner that control pulses appear simultaneously at the input of one of the two-gates and the output leads of delay devices of only one sub-combination of delay devices at a time from the other group or groups, and means for applying pulses from the output of each delay device in the said excepted group to the said last-mentioned or another input of the two-gate associated with the delay device. Such an arrangement employed in the aforesaid proposed automatic telephone system, gives complete protection against two or more simultaneously operative subscribers line terminating units being allotted the same channel. Each of the operative line terminating units is allotted a free channel in turn.

In putting the invention into effect coaxial cables will need to be used. The power to these cables from the gate devices would need to be fed in such a way as to prevent interaction between signals on different cables, and this may involve the use of as many as three extra diodes in each gate circuit and an amplifier associated with each cable.

According to a further feature of this invention, a more economical circuit arrangement is provided in which the circuits connecting the outputs of the delay devices to their respective inputs comprise an output lead for each delay device connecting the output of the delay device to an input of each of the gate devices associated therewith, a separate input lead for each delay device of one of the groups, a connection from the output of each of the gate devices to the separate input lead of its associated delay device in the last said one of the groups, means for feeding the pulses appearing in the inputs of the delay devices in the said one of the groups to the input of each of a plurality of two-gates whose outputs are connected to the inputs respectively of the delay devices in the other group or groups, means for feeding pulses appearing in the output of each delay device in the said other group or groups to another input of the two-gate associated with the delay device, means for applying control pulses to the outputs of the other group or groups of delay devices in such a manner that control pulses appear in the outputs of only one sub-combination of delay devices at a time from the said other group or groups, and means for applying a control voltage to the input of the gate device associated with a selected output terminal, the last said input being associated with a delay device from the said one group. In this way the number of input leads to the delay devices from the gate devices is reduced to the number of delay devices in the said one of the groups. The pulses appearing in the input leads to the delay devices in the last said one group may be combined by means of a one-gate and then fed to the two-gates. Means may then be provided in the one-gate for inhibiting transmission of pulses therethrough in response to the application thereto of an inhibiting pulse.

The complete protection hereinbefore referred to may be achieved in the circuit arrangement last referred to by arranging that said input leads to the delay devices in the said one group are connected to first inputs of further two-gates respectively whose outputs are connected to the delay devices respectively in the said one group, and wherein means are provided for feeding pulses appearing in the output of each of the last-mentioned delay devices to another input of the further two-gate associated therewith, and wherein means are provided for applying control pulses in turn to the last said inputs or further inputs of the further two-gates in such a manner that control pulses appear at the inputs of the two-gates of only one combination of delay devices at a time from all the groups.

Alternatively complete protection can be provided by connecting the inputs of the delay devices in the said one group to inputs respectively of another two-gate, output pulses from which are fed to inhibit transmission of pulses from the said separate input leads to the first-mentioned two-gates.

In yet another circuit arrangement according to this invention, all the delay devices are served by one common lead from all the gate devices, thereby reducing still further the number of coaxial cables which may be required. In this arrangement, the circuits connecting the outputs of the delay devices with their respective inputs comprise an output lead for each delay device connecting the delay device to an input of each of the gate devices associated with that delay device, a common lead connecting the outputs respectively of the gate devices to an input of each of a plurality of two-gates whose outputs are connected to the inputs respectively of the delay devices, means for feeding pulses appearing in the output lead of each delay device to another input of the two-gate associated therewith, means for applying control pulses in turn to other inputs of the two-gates associated with the delay devices in one of the groups, and applying control pulses in turn to the outputs of the delay devices of the other group or groups the arrangement being such that control pulses appear at the two-gates of only one combination of delay devices at a time, and means being provided for applying a control voltage to an input of the gate device associated with the selected output terminal, the last said input being an input associated with a delay device in the said one group.

In still yet another circuit arrangement, the need for coaxial cables from the outputs of the gate devices to the inputs of the delay devices is eliminated by arranging that the circuits connecting the outputs of the delay devices with their respective inputs comprise a local circuit for each delay device connecting the output to the input thereof without passing through an associated gate device, the different combinations of delay devices being connected to different ones of the gate devices by an output lead from a point in each local circuit to an input of each associated gate device. The applications of such an arrangement are however limited, since pulse circulation cannot be set up by applying a control pulse to any of the gate devices. For this reason it may be unsuitable for use with subscribers line terminating units. The circuit arrangement is however suitable for use in the trunk terminating units of the aforesaid proposed automatic telephone system, where no provision need be made for starting circulation at these units.

A time division multiplex telecommunications system including circuit arrangements according to the present invention will now be described, by way of example, with reference to the accompanying drawings, in which.

Figure 1:
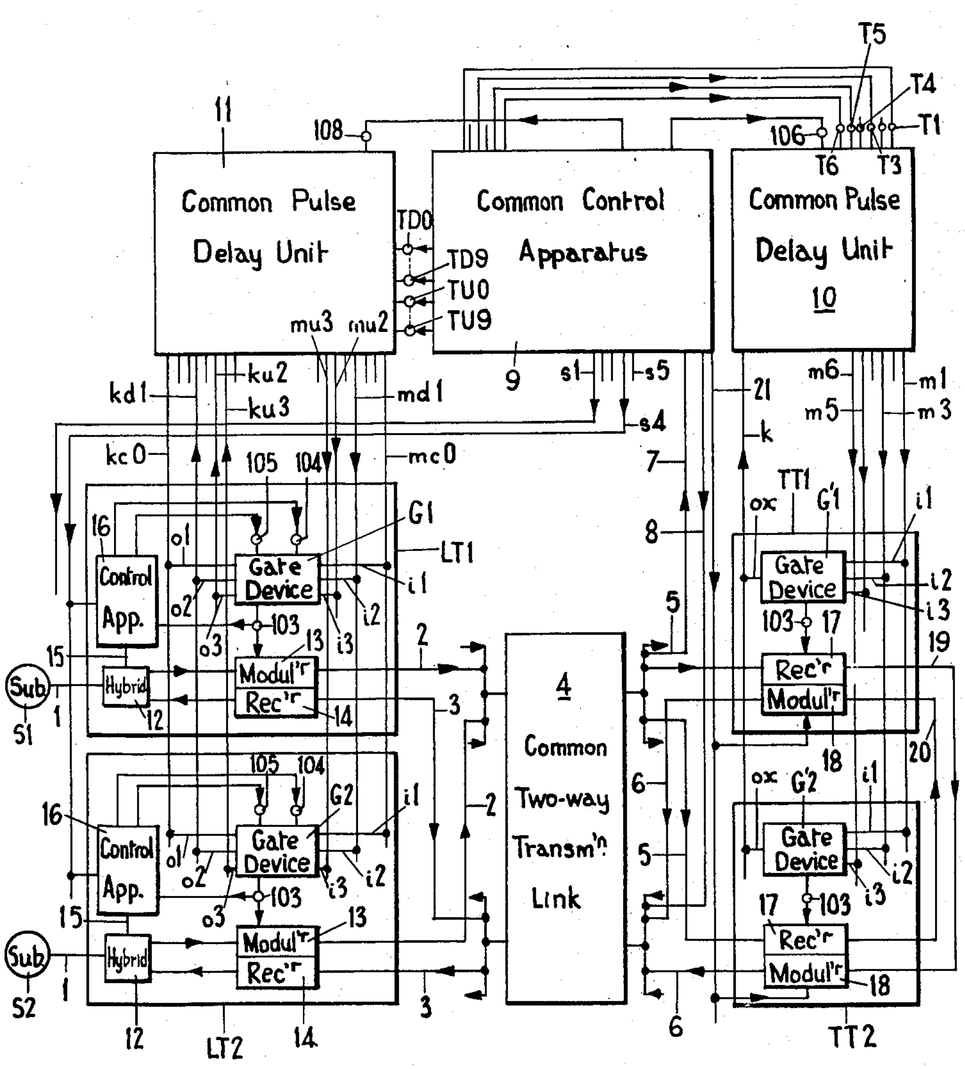
Figure 1 is a block schematic diagram of the multiplex telecommunications system.

Referring to Figure 1, each of a group of 500 subscribers S1 to S500 of which only the subscribers S1 and S2 are shown, is connected by a line 1 to an individual one of 500 line terminating units LT1 to LT500 of which only the line terminating units LT1 and LT2 individual to the subscribers S1 and S2 respectively, are shown. Each of the line terminating units LT1 to LT500 is connected by a lead 2 and a lead 3 to one end of a common two-way transmission link 4.

Each of twenty trunk terminating units TT1 to TT20 of which only the trunk terminating units TT1 and TT2 are shown, is connected by a lead 5 and a lead 6 to the other end of the link 4. This other end of the link 4 is also connected by leads 7 and 8 to common control apparatus 9 which is itself connected by one of five leads *s1* to *s5* to each of the line terminating units LT1 to LT500. The common control apparatus 9 is connected to both of the line terminating units LT1 and LT2 by the lead *s4*.

The common control apparatus 9 is also connected to a terminal 106 and to each of six terminals T1 to T6, of a common pulse delay unit 10. In addition, the common control apparatus 9 is connected to a terminal 108 and to each of ten terminals TD0 to TD9 and ten terminals TU0 to TU9, of a common pulse delay unit 11.

The line 1 of each of the subscribers S1 to S500 is connected through a hybrid unit 12 in the respective line terminating unit to transmit speech and dialling signals to a modulator 13 and also to receive speech and other signals from a receiver 14 in that line terminating unit. The leads 2 and 3 of the line terminating units LT1 to LT500 are connected to the outputs of the modulators 13 and to the inputs of the receivers 14 respectively, in those line terminating units.

In each of the line terminating units LT1 to LT500 the hybrid unit 12 is connected by a lead 15 to control apparatus 16 which is itself connected to terminals 104 and 105 of a gate device G. The gate devices G in the line terminating units LT1 to LT500 are referred to hereinafter, collectively or individually, as the gate devices G1 to G500, respectively.

Each of the gate devices G1 to G500 is connected by input branch leads *i*1, *i*2 and *i*3 to receive pulses from three of twenty-five output leads *mc*0 to *mc*4, *md*0 to *md*9, and *mu*0 to *mu*9 of the common pulse delay unit 11, and is also connected by output branch leads *o*1, *o*2 and *o*3 to apply pulses to three of twenty-five input leads *kc*0 to *kc*4, *kd*0 to *kd*9, and *ku*0 to *ku*9 of the common pulse delay unit 11. The gate devices G1 to G500 are thereby connected by the input branch leads *i*1, *i*2 and *i*3 thereof, to respective combinations of three of the twenty-five leads *mc*0 to *mc*4, *md*0 to *md*9, and *mu*0 to *mu*9, each such combination comprising one of the leads *mc*0 to *mc*4, one of the leads *md*0 to *md*9, and one of the leads *mu*0 to *mu*9. In addition, the gate devices G1 to G500 are connected by the output branch leads *o*1, *o*2 and *o*3 thereof, to a respective combination of three of the leads *kc*0 to *kc*4, *kd*0 to *kd*9, and *ku*0 to *ku*9. Each of these latter combinations comprises the three input leads of the leads *kc*0 to *kc*4, *kd*0 to *kd*9 and *ku*0 to *ku*9 which correspond in references to the three leads in the combination of output leads *mc*0 to *mc*4, *md*0 to *md*9 and *mu*0 to *mu*9 to which the respective gate device is connected. For example, the gate device G1 is connected by the leads *i*1, *i*2 and *i*3 to the leads *mc*0, *md*1 and *mu*2 respectively, and also, by the leads *o*1, *o*2 and *o*3 to the leads *kc*0, *kd*1 and *ku*2, respectively. On the other hand the gate device G2 is connected by the input leads *i*1, *i*2 and *i*3 to the leads *mc*0, *md*1 and *mu*3, respectively, and also, by the output leads *o*1, *o*2 and *o*3 to the leads *kc*0, *kd*1 and *ku*3.

An output terminal 103 of the gate device G in each of the line terminating units LT1 to LT500 is connected to the control apparatus 16 and also to the modulator 13 and receiver 14, in that unit.

Each of the twenty trunk terminating units TT1 to TT20 includes a receiver 17 and a modulator 18, the leads 5 and 6 of each trunk terminating unit being connected to the input of the receiver 17 and to the output of the modulator 18, respectively, in that unit. Each of the trunk terminating units TT1 to TT20 also includes a gate device G′. The gate devices G′ in the trunk terminating units TT1 to TT20 are referred to hereinafter, collectively or individually, as the gate devices G′1 to G′20, respectively.

Each of the gate devices G'1 to G'20 is connected by respective input brach leads *i*1, *i*2 and *i*3 to receive pulses from three of six output leads *m*1 to *m*6 of the common pulse delay unit 10, and to apply pulses by an output branch lead *ox* to an input lead *k* of the unit 10. The lead *k* is common to all the gate devices G'1 to G'20. Different ones of the gate devices G'1 to G'20 are connected by the input branch leads *i*1, *i*2 and *i*3 thereof, to different combinations of three of the leads *m*1 to *m*6. For example, the gate device G'1 is connected by the leads *i*1, *i*2 and *i*3 to the leads *m*1, *m*3 and *m*5 respectively. On the other hand the gate device G'2 is connected by the leads *i*1, *i*2 and *i*3 to the leads *m*1, *m*3 and *m*6 respectively.

An output terminal 103 of the gate device G' in each of the trunk terminating units TT1 to TT20 is connected to the receiver 17 and modulator 18 in that unit. The trunk terminating units TT1 to TT20 are connected together in pairs to thereby provide ten such pairs of trunk terminating units. The trunk terminating units of each pair such as the pair of units TT1 and TT2, are interconnected as for example by a lead 19 and a lead 20. The lead 19 connects the output of the receiver 17 in the unit TT1 to the input of the modulator 18 in the unit TT2, and the lead 20 connects the output of the receiver 17 in the unit TT2 to the input of the modulator 18 in the unit TT1. A lead 21 from the common control apparatus 9 is connected to the modulator 18 in each of the twenty trunk terminating units TT1 to TT20.

In operation speech signals may be transmitted between any two subscribers of the group connected to the common two-way transmission link 4, such communication taking place between those subscribers through an allotted pair of the trunk terminating units TT1 to TT20, in both directions over the link 4. Speech signals from the calling subscriber are transmitted from the modulator 13 of that subscriber's line terminating unit in a first of one hundred time interlaced pulse communication channels, to be received from the link 4 by the receiver 17 of a first of the allotted pair of trunk terminating units. The speech signals so received are passed from that receiver 17 to the modulator 18 of the second of the allotted pair of trunk terminating units. These signals are transmitted over the link 4 by that modulator 18 in a second of the one hundred time interlaced pulse communication channels for reception by the receiver 14 of the called subscriber's line terminating unit, and thereby by the called subscriber.

Similarly, speech signals from the called subscriber are transmitted over the link 4 in the second communication channel to be received by the second trunk terminating unit. These signals are passed by that trunk terminating unit to the first trunk terminating unit for transmission over the link 4 in the first communication channel for reception by the calling subscriber's line terminating unit.

Each of the one hundred time interlaced pulse communication channels has a channel period of ½ microsecond and a recurrence period of 100 microseconds, speech signals being transmitted in any one such channel as amplitude modulation of a ½ microsecond pulse occurring in an appropriate time position. In this manner therefore, signals are transmitted in any one particular channel by amplitude modulating the pulses of a pulse train. The pulse recurrence period of this pulse train is 100 microseconds, and the pulses thereof have a duration of ½ microsecond.

The modulator 13 in each of the line terminating units LT1 to LT500 amplitude modulates any pulse applied thereto from the output terminal 103 of the respective gate device G with the signal at that time applied to the input of that modulator 13. In this manner the signals applied to the line 1 are transmitted over the lead 2 of that line terminating unit in the communication channel determined by the train of pulses which appear at that time at the output terminal 103 of the gate device G.

The modulators 18 in the trunk terminating units TT1 to TT20 are similar to the modulators 13. Thus the signals applied to the modulators 18 in the trunk terminating units TT1 and TT2 from the leads 20 and 19 respectively, are transmitted over the leads 6 of those units. These signals are transmitted over the leads 6 in the communication channels determined by the train of pulses appearing at the terminals 103 of the gate devices G'1 and G'2 in those respective units.

In addition, each of the receivers 14 and 17 is of a form which receives and demodulates any amplitude modulated pulses applied thereto (in the case of receivers 14 from the leads 3, and in the case of receivers 17 from the leads 5) which are coincident in time with pulses applied to that receiver from the output terminal 103 of the gate device G or G', as the case may be.

Figure 2:
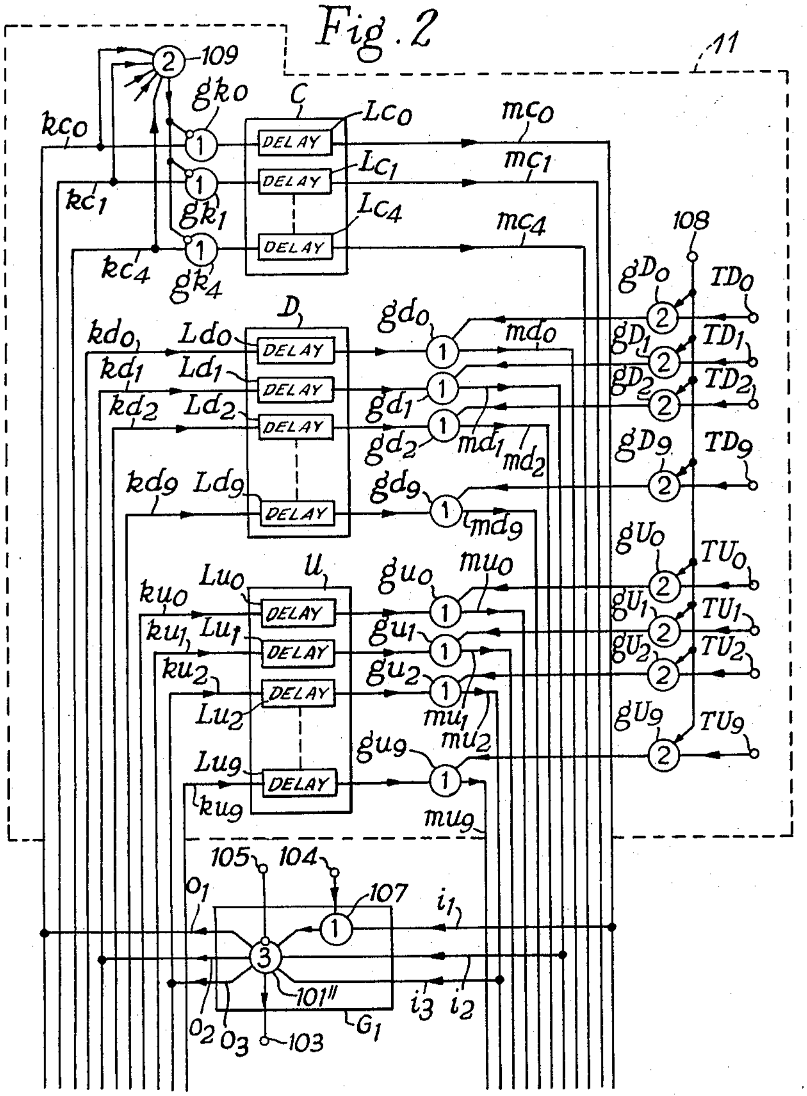
Figure 2 is a block schematic diagram of a circuit arrangement according to the present invention, which forms a part of the system as shown in Figure 1.

The circuit arrangement of the common pulse delay unit 11 is represented in block schematic form in Figure 2. In addition, in order to show the circuit arrangement of each of the gate devices G1 to G500 and the manner in which these are connected to the unit 11, one such gate device, the gate device G1, is shown in block schematic form in Figure 2.

Referring to Figure 2, each of the gate devices G1 to G500 (as represented by the gate device G1 in this figure) comprises a one-gate 107 provided with two inputs, and a three-gate 101'' having three inputs and four outputs. One of two inputs of the gate 107 is connected to the input terminal 104 and the other is connected to the input branch lead *i*1.

The three inputs of the three-gate 101'' are connected to the output of the gate 107 and the input branch leads *i*2 and *i*3 respectively, and three of the four outputs are connected to the output branch leads *o*1, *o*2 and *o*3 respectively. The fourth output of the gate 101'' is connected to the output terminal 103.

In the common pulse delay unit 11, twenty-five delay lines, each having a delay time of 100 microseconds, are arranged in three groups C, D and U. Group C comprises five delay lines Lc0 to Lc4 of which only the delay lines Lc0, Lc1, and Lc4 are shown. Group D comprises ten delay lines L*d*0 to L*d*9 of which only the delay lines L*d*0, L*d*1, L*d*2, and L*d*9 are shown, and group U comprises ten delay lines L*u*0 to L*u*9 of which only the delay lines L*u*0, L*u*1, L*u*2 and L*u*9 are shown.

The outputs of the delay lines Lc0 to Lc4 are connected to the output leads *mc*0 to *mc*4, the outputs of the delay lines L*d*0 to L*d*9 to the output leads *md*0 to *md*9, and the outputs of the delay lines L*u*0 to L*u*9 are connected to the output leads *mu*0 to *mu*9, respectively. The inputs of the delay lines Lc0 to Lc4, L*d*0 to L*d*9, and L*u*0 to L*u*9 are connected to the input leads *kc*0 to *kc*4, *kd*0 to *kd*9 and *ku*0 to *ku*9 respectively.

The output leads *md*0 to *md*9 and *mu*0 to *mu*9 include respective one-gates *gd*0 to *gd*9 and *gu*0 to *gu*9. Each of these latter gates had two inputs and an output, one of these two inputs and the output being connected in the respective output lead.

The other inputs of the one-gates *gd*0 to *gd*9 and *gu*0 to *gu*9 are connected to the outputs respectively of two groups of two-gates *g*D0 to *g*D9 and *g*U0 to *g*U9. An input of each of these two-gates is connected to the common input terminal 108. The other inputs of the two-gates *g*D0 to *g*D9 are connected to the input terminals TD0 to TD9 and the other inputs of the gates *g*U0 to *g*U9 are connected to the input terminals TU0 to TU9 respectively.

In addition, the input leads *kc*0 to *kc*4 are connected to the inputs respectively of a two-gate 109 whose output is connected to an inhibiting terminal on each of five one-gates *gk*0 to *gk*4 which are connected in the leads *kc*0 to *kc*4.

In order to explain generally the operation of the system as illustrated in Figure 1 it will be assumed that the subscriber S1 wishes to call the subscriber S2.

When the subscriber S1 lifts his instrument from its rest to make the call to the subscriber S2, the consequent change in current in the line 1 connected to the line terminating unit LT1, causes a voltage to be applied through the hybrid unit 12 to the control apparatus 16 over the lead 15. Normally the control apparatus 16 applies an inhibiting voltage to the terminal 105, but in response to the voltage applied to the control apparatus 16 by the hybrid unit 12, this inhibiting voltage is removed.

In operation of the system illustrated in Figure 1 the common control apparatus 9 applies pulses of 100 microseconds duration in cyclic succession to the terminals TD0 to TD9 at a cyclic period of 1,100 microseconds, and also applies pulses of 100 microseconds duration in cyclic succession to the terminals TU0 to TU9, the cyclic period of these latter pulses being 1,300 microseconds. In addition, the common control apparatus 9 derives a "free-channel pulse," that is, a pulse of ½ microsecond duration in the time position of one of the channels not already engaged in the common two-way transmission link 4, and applies this pulse to the terminal 108. The free-channel pulse is also applied to one of the leads *s*1 to *s*5, the particular one of the leads *s*1 to *s*5 to which this pulse is applied being varied cyclically.

During a period of 100 microseconds for which a pulse is concurrently applied to one of the terminals TD0 to TD9, and one of the terminals TU0 to TU9 the ½ microsecond pulse applied to the terminal 108 appears at the output of only one of the two-gates (Figure 2) in each of the two groups *g*D0 to *g*D9 and *g*U0 to *g*U9 at a time. Thus a ½ microsecond pulse in the time position of the free channel represented by the free-channel pulse applied to the terminal 108, appears on one only of the leads *md*0 to *md*9, and on one only of the leads *mu*0 to *mu*9. The particular ones of the leads *md*0 to *md*9 and *mu*0 to *mu*9 upon which this ½ microsecond pulse appears, varies cyclically in dependence upon the pulses applied by the common control apparatus 9 to the terminals TD0 to TD9 and TU0 to TU9.

The free-channel pulse applied cyclically to the leads *s*1 to *s*5 is applied by those leads to the control apparatus 16 in each of the line terminating units to which those respective leads are connected. This pulse is applied by the control apparatus 16 to the terminal 104 of the gate device 9 in the respective line terminating unit.

At sometime subsequent to the removal of the inhibiting voltage from the terminal 105 in the line terminating unit LT1 therefore, a pulse characteristic of a free channel appears on the leads *md*1 and *mu*2 and also on the lead *s*4. This results in the concurrent application of this pulse to the three-gate 101″ in the gate device G1 over the input leads *i*2 and *i*3 and from the one-gate 107. As a result, this ½ microsecond pulse is applied from the gate device G1 to its output terminal 103 and to the common pulse delay unit 11 over the leads *o*1, *o*2 and *o*3, and the leads *kc*0, *kd*1 and *ku*2.

The pulse in the time position of the free channel appearing at the output terminal 103 of the gate device G1 is applied therefrom to the control apparatus 16, the modulator 13, and the receiver 14. The application of this pulse to the control apparatus 16 inhibits the application of further free-channel pulses to the terminal 104 in order that the gate device G1 shall not respond to the simultaneous appearance of any ½ microsecond pulse in the time position of any other channel, upon the leads *md*1 and *mu*2.

The pulse appearing at the terminal 103, that is, the pulse in the free channel in effect seized by the line terminating unit LT1, is applied as stated above, to the modulator 13 which as a result applies a pulse in the seized channel over the lead 2 to the common two-way transmission link 4. The common control apparatus 9 is responsive to the resulting appearance of this pulse on the lead 7 after passage through the link 4.

The appearance of this pulse on the lead 7 indicates that this particular channel which was formerly free has been seized by one of the line terminating units LT1 to LT500.

The ½ microsecond pulses applied simultaneously to the common pulse delay unit 11 from the gate device G1 over the leads *kc*0, *kd*1 and *ku*2 applied to the delay lines L*c*0, L*d*1 and L*d*2. These pulses are each delayed by 100 microseconds within those delay lines and are applied simultaneously from the outputs of those delay lines to the leads *mc*0, *md*1 and *mu*2.

The ½ microsecond pulses appearing simultaneously on the leads *mc*0, *md*1 and *mu*2 100 microseconds after the application of the pulses to the common pulse delay unit 11 from the gate device G1, are applied to the gate device G1 by the input leads *i*1, *i*2 and *i*3. The pulse applied to the lead *i*1 is applied through the one-gate 107 to the three-gate 101″ so that the three pulses are concurrently applied to the three inputs of that three-gate. As a result a ½ microsecond pulse in the time position of the pulses applied to the gate device G1 by the input leads *i*1, *i*2 and *i*3 appears simultaneously in the output leads *o*1, *o*2 and *o*3 and also at the terminal 103. As before, the resulting simultaneous application of the ½ microsecond pulse to the common pulse delay unit 11 over the leads *kc*0, *kd*1 and *ku*2, from the output leads *o*1, *o*2 and *o*3, results in the simultaneous appearance of ½ microsecond pulses in each of the leads *mc*0, *md*1 and *mu*2 after a further delay of 100 microseconds in the delay lines L*c*0, L*d*1 and L*u*2. The simultaneous appearance of pulses in the leads *mc*0, *md*1 and *mu*2 results in the continued circulation of pulses around the loop circuit including the gate device G1, the leads *kc*0, *kd*1 and *ku*2, the delay lines L*c*0, L*d*1 and L*u*2, and the leads *mc*0, *md*1 and *mu*2. There is a delay of 100 microseconds between the application of pulses to the common pulse delay unit 11 over the leads *kc*0, *kd*1 and *ku*2, and the resultant appearance of pulses on the leads *mc*0, *md*1 and *mu*2.

Each time pulses are applied simultaneously by the input leads *i*1, *i*2 and *i*3 to the gate device G1, a pulse appears at the output terminal 103 of that gate device so that a ½ microsecond pulse in the time position of the channel seized by the line terminating unit LT1 recurs at the output terminal 103 every 100 microseconds. Thus a train of ½ microsecond pulses is applied to the modulator 13 and receiver 14 of the line terminating unit LT1, in the time position of the seized channel.

The common control apparatus 9, in addition to inhibiting the appearance of free-channel pulses in the time position of the seized channel allots to the calling subscriber S1 a register within that apparatus 9. The common control apparatus 9 then applies dialling tone in the seized channel to the lead 8 for transmission over the common two-way transmission link 4 for reception by the receiver 14 of the line terminating unit LT1. This dialling tone is received by the subscriber S1 from the receiver 14 of the line terminating unit LT1, and in response to this the subscriber S1 transmits dialling impulses, characteristic of the subscriber S2, to the line terminating unit LT1 for transmission by the modulator 13 over the common two-way transmission link 4 and the lead 7, to the allotted register in the common control apparatus 9. These dialling impulses are transmitted by the modulator 13 in the channel seized by the line terminating unit LT1.

The common control apparatus 9 is arranged such that the next free-channel pulse applied to that one of the leads *s*1 to *s*5 which is connected to the called subscriber's line terminating unit, that is, the lead *s*4 is of double the amplitude of pulses normally applied to the leads *s*1 to *s*5. This pulse is applied to the lead *s*4 during the cyclically recurring period for which 100 microsecond pulses are applied concurrently to the terminals TD1 and TU3.

Assuming that the subscriber S2 is not engaged the control apparatus 16 in the line terminating unit LT2 is responsive to the free-channel pulse of double amplitude applied thereto, to apply this pulse to the terminal 104 and to remove the inhibiting voltage from the terminal 105 of the gate device G2.

The concurrent application of 100 microsecond pulses to the terminals TD1 and TU3 results in the appearance of a ½ microsecond pulse from the terminal 108 and in the time position of a free channel, on the leads *md*1 and *mu*3, these leads *md*1 and *mu*3 being the leads of the leads *md*0 to *md*9, and *mu*0 to *mu*9, to which the gate device G2 is connected. The ½ microsecond pulse appearing on the leads *md*1 and *mu*3 has the time position of a free-channel pulse due to the application of such a free-channel pulse to the terminal 108 by the common control apparatus 9 during the simultaneous application of the 100 microsecond pulses to the terminals TD1 to TU3.

The appearance of ½ microsecond pulses on the leads *md*1 and *mu*3, and therefore upon the leads *i*2 and *i*3 of the gate device G2, simultaneously with the application of a free-channel pulse to the terminal 104 of the gate device G2, results in the circulation of pulses in the time position of the further free-channel around the loop circuit formed by the gate device G2, the leads *kc*0, *kd*1 and *ku*3, the delay lines L*c*0, L*d*1 and L*u*3, and the leads *mc*0, *md*1 and *mu*3. This further channel is thereby seized by the line terminating unit LT2 and a train of pulses in this channel appears at the terminal 103 of the gate device G2 to be applied therefrom to the modulator 13 and the receiver 14 in the line terminating unit LT2.

It will be appreciated that there are now two pulses circulating in loop circuits which include in common the delay line L*c*0 and also in loop circuits which include in common the delay line L*d*1. One of these pulses is in the time position of the channel seized by the line terminating unit LT1 and the other is in the time position of the channel seized by the line terminating unit LT2. There is no mutual interference between these two pulses since they are displaced in time from one another. Furthermore the gate devices G1 and G2 are only responsive to the appropriate ones of the pulses appearing in the leads *mc*0 and *md*1 owing to the fact that those gate devices are connected to the different leads *mu*2 and *mu*3, the appropriate pulse from the gate device G1 appearing on the lead *mu*2 but not on the lead *mu*3, and the appropriate pulse for the gate device G2 appears on the lead *mu*3 but not on the lead *mu*2.

In response to the dialling impulses from the calling subscriber S1, the common control apparatus 9 also allots to the call a free pair of trunk terminating units, it being assumed in the present example that the allotted free pair of trunk terminating units are the trunk terminating units TT1 and TT2. This pair of trunk terminating units TT1 and TT2 is allotted to the call by applying to appropriate ones of the terminals T1 to T6 ½ microsecond pulses to cause a pulse in the time position of the channel seized by the line terminating unit LT1 to appear on the leads *m*1, *m*3 and *m*5, and a pulse in the time position of the channel seized by the line terminating unit LT2 to appear on the leads *m*1, *m*3 and *m*6.

A pulse in the time position of the channel seized by the line terminating unit LT1 is caused to appear on the leads *m*1, *m*3 and *m*5 by applying a ½ microsecond pulse in this time position simultaneously to the terminals T1, T3 and T5, the resulting ½ microsecond pulse on the leads *m*1, *m*3 and *m*5 being applied to the gate device G'1 by the input leads *i*1, *i*2 and *i*3 of that gate device. As a result, the gate device G'1 applies this pulse to the output terminal 103 thereof and also, over the output lead *ox* and the lead *k*, to the common pulse delay unit 10.

The pulse appearing at the output terminal 103 of the gate device G'1 is applied therefrom to the receiver 17 and the modulator 18 in the trunk terminating unit TT1. This pulse reappears on the leads *m*1, *m*3 and *m*5 after 100 microseconds delay in the common pulse delay unit 10, and continues to circulate in the loop circuit formed by the gate device G'1, the lead *k*, the common pulse delay unit 10, and the leads *m*1, *m*3 and *m*5, such that ½ microsecond pulses in the channel seized by the line terminating unit LT1 appear at the terminal 103 of the gate device G'1 to be applied therefrom to the receiver 17 and the modulator 18 in the trunk terminating unit TT1.

Similarly pulses in the time position of the channel seized by the line terminating unit LT2 are caused to appear simultaneously on the leads *m*1, *m*3 and *m*6, by applying a ½ microsecond pulse in this time position simultaneously to the terminals T1, T3 and T6, the appearance of these pulses in the leads *m*1, *m*3 and *m*6 resulting in the circulation of pulses in the loop circuit formed by the gate device G'2, the lead *k*, the common pulse delay unit 10, and the leads *m*1, *m*3 and *m*6. As a result ½ microsecond pulses in the channel seized by the line terminating unit LT2 appear at the output terminal 103 of the gate device G'2 and are applied therefrom to the receiver 17 and the modulator 18 in the trunk terminating unit TT2.

The common control apparatus 9 now applies ringing signals to the lead 8 in the channel seized by the line terminating unit LT2, for reception by the receiver 14 in the line terminating unit LT2. These signals are applied through the hybrid unit 12 to cause the control apparatus 16 in the unit LT2 to operate the bell of the subscriber S2. In addition, ringing tone is transmitted by the common control apparatus 9 over the lead 8 for reception by the receiver 14 of the line terminating unit LT1, in the channel seized by that unit. Pulses in the channels seized by the line terminating units LT1 and LT2 are also transmitted over the lead 21 by the common control apparatus 9 for the duration of the application of ringing signals and ringing tone to the subscribers S2 and S1 respectively. The application of these pulses to the modulators 18 in the trunk terminating units TT1 and TT2 suppresses the transmission of pulses by those modulators in order that the transmission of ringing signals and ringing tone to the line terminating units LT2 and LT1 respectively, is not affected by pulses from modulators 18.

When the subscriber S2 answers, the lifting of his instrument from its rest causes a change in the current condition of the line 1 connected to that subscriber, which in turn results in a change in the amplitude of pulses transmitted by the modulator 13 in the channel seized by the line terminating unit LT2. This change in amplitude is detected by the common control apparatus 9, the pulses transmitted by the modulator 13 of the line terminating unit LT2 being received by the common control apparatus 9 from the link 4 over the lead 7. On the detection of this change of amplitude, the register allotted to the calling subscriber S1, in the common control apparatus 9, is then released for use in setting up any other call originating in the group of subscribers S1 to S500. At the same time the common control apparatus 9 ceases to apply ringing signals and ringing tone to the line terminating units LT2 and LT1 respectively, and also ceases to apply pulses to the lead 21 in the channels seized by those line terminating units.

In the call between the subscriber S1 and the subscriber S2, speech signals may be transmitted from the subscriber S1 to the subscriber S2, and from the subscriber S2 to the subscriber S1, speech signals from the calling subscriber S1 being transmitted by the modulator 13 of the line terminating unit LT1 over the common two-way transmission link 4 to be received by the receiver 17 of the trunk terminating unit TT1 in the channel seized by the line terminating unit LT1. These signals are then passed by the lead 19 for transmission by the modulator 18 of the trunk terminating unit TT2, in the channel seized by the line terminating unit LT2, the signals transmitted by this modulator 18 being received from the common two-way transmission link 4 by the receiver 14 in the line terminating unit LT2, and passed thereby to the subscriber S2. Speech signals from the subscriber S2 are transmitted by the modulator 13 of the line terminating unit LT2 over the common two-way transmission link 4 to be received by the receiver 17 of the trunk terminating unit TT2 in the channel seized by the line terminating unit LT2. These signals are then passed by the lead 20 for transmission by the modulator 18 of the trunk terminating unit TT1, in the channel seized by the line terminating unit LT1, the signals transmitted by this modulator 18 being received by the receiver 14 in the line terminating unit LT1 and passed thereby to the subscriber S1.

At the end of the call between the subscriber S1 and the subscriber S2, each of the subscribers replaces his instrument thereby causing the current condition of the lines 1 connected to those subscribers to change. This change in current condition of the line 1 connected to the line terminating unit LT1 is transmitted to the control apparatus 16 in that line terminating unit to apply an inhibiting voltage to the terminal 105 of the gate device G1 and thereby stop the circulation of pulses in the loop circuit including the gate device G1. Pulses in the channel originally seized by the line terminating unit LT1 thereby cease to appear at the terminal 103 of the gate device G1.

Similarly the change in current condition of the line 1 connected to the line terminating unit LT2 results in the application of an inhibiting voltage to the terminal 105 of the gate device G2 to stop the circulation of pulses in the loop circuit including the gate device G2. As a result pulses in the channel seized by the line terminating unit LT2 cease to appear at the terminal 103 of the gate device G2.

The common control apparatus 9 is responsive to the fact that pulses in the channel seized by the line terminating units LT1 and LY2 are no longer received over the lead 7 from the common two-way transmission link 4, and as a result applies pulses in these channels to the terminal 106. The application of these pulses to the terminal 106 temporarily prevents further circulation of pulses in these channels within the common pulse delay unit 10. Pulses therefore cease to appear at the terminal 103 of each of the gate devices G'1 and G'2. The trunk terminating units TT1 and TT2 are in this manner released for use in another call.

The fact that pulses no longer appear on the lead 7 in either of the communication channels allotted to the line terminating units LT1 and LT2 indicates to the common control apparatus 9 that both these channels are now free channels, and may be used in any subsequent call.

Protection is given by the circuit shown in Figure 2 against the simultaneous seizure of the same channel by two or more of the line terminating units LT1 to LT500. For example, let it be assumed that the gate device G1 and the gate device G2 are simultaneously brought into operation to receive free-channel control pulses. At the instant when control pulses appear simultaneously on output leads *md*1 and *mu*2 control pulses appear at the gates 107 of the two gate devices G1 and G2. The three-gate 101'' in each of the two gate devices G1 and G2 transmits this control pulse and pulses in the same phase appear in the input leads *kc*0, *kc*1, *kd*1, and *ku*2. The pulses appearing in the leads *kc*0 and *kc*1 are fed to the gate 109 which responds thereto and delivers an output pulse to the inhibiting terminals on the one-gates *gk*0 to *gk*4 thereby inhibiting transmission of pulses in that phase through the gates *gk*0 and *gk*1.

Figures 3, 4, 5:
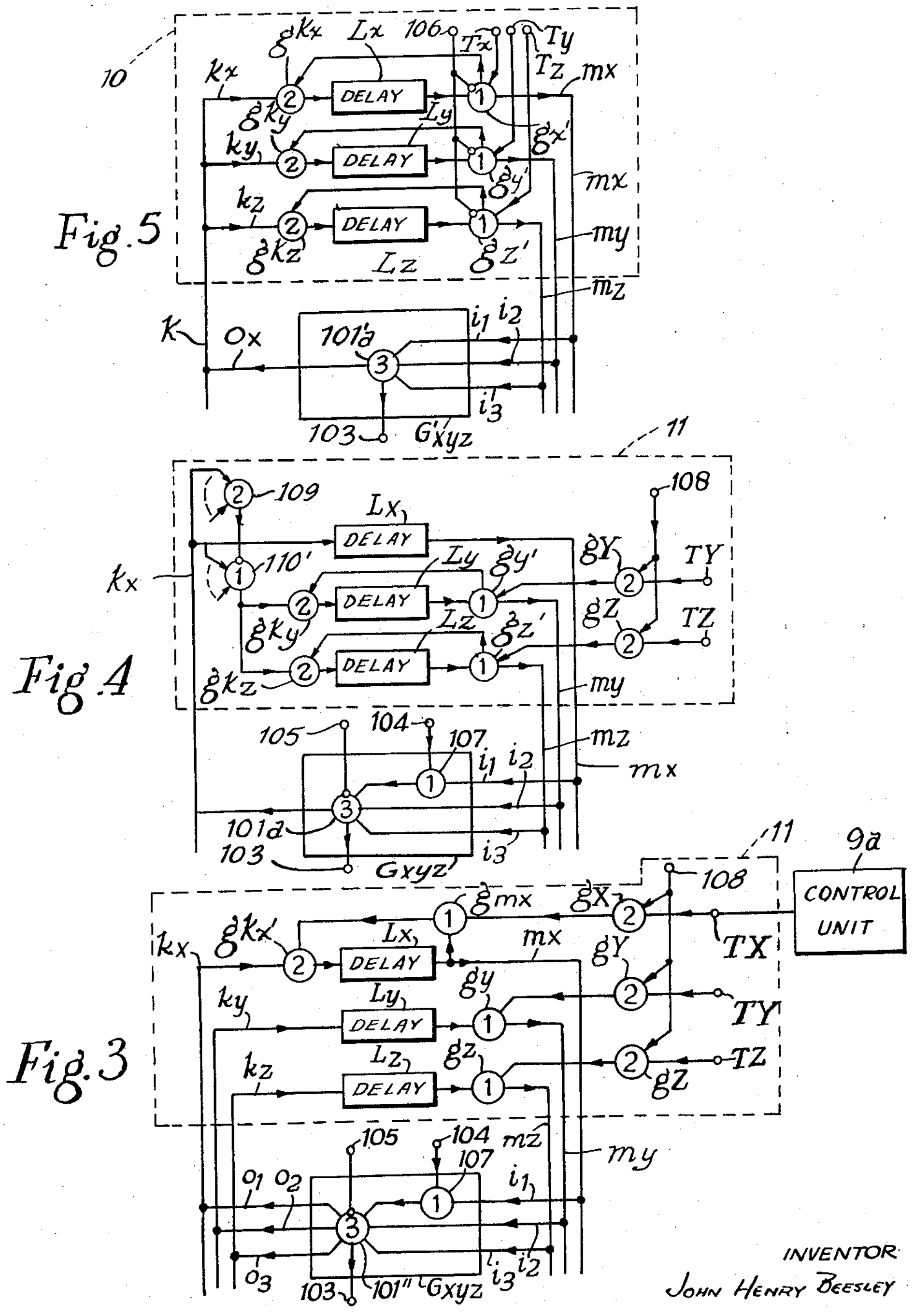
Figure 3 is a block schematic diagram of one alternative form of circuit arrangement according to the present invention, which may replace the circuit arrangement of Figure 2 in the system shown in Figure 1.
Figure 4 is a block schematic diagram of another alternative form of circuit arrangement according to the present invention, which may replace the circuit arrangement of Figure 2 in the system shown in Figure 1.
Figure 5 is a block schematic diagram of a circuit arrangement according to the present invention, which may form another part of the system shown in Figure 1.

The construction of the one-gates, two-gates and three-gates shown in Figure 2 will be readily understood by those skilled in the art. Reference may however be made to sections 4—3—4 of "High Speed Computing Devices" by the Staff of Engineering Research Associates Inc., published by McGraw Hill Book Company Inc. in 1950. The circuit shown in Figures 4–2*b* is suitable for use as a two-gate and may readily be modified, as indicated in the reference, to serve as a three-gate. Reference may also be made to volume 19 (Waveforms) of the Massachusetts Institute of Technology Radiation Laboratories Series, sections 10—3 and Figures 10—6 to 10—11, also published by the McGraw Hill Book Company Inc. The circuit shown in Figures 10—18 of this reference may also serve as a three-gate.

The delay lines L*c*0 to L*c*4, L*d*0 to L*d*9, and L*u*0 to L*u*9 may be mercury delay lines of known kind or preferably magnetostrictive delay lines. Reference to the construction of magnetostrictive delay lines may be found in an article entitled "Magnetostrictive Delay Line" by E. M. Bradburd in the March 1951 issue of Electrical Communication published by the International Telephone & Telegraph Corp.

The delay lines include a blocking oscillator or cathode follower as an input stage and a single amplifier output stage. The output pulses from the delay lines may be reshaped by applying clock pulses from which the control pulses are derived, to a shaping gate of known kind connected in the output circuit of the delay line.

The input and output leads of the unit 11 are preferably coaxial cables, and the arrangement is such that power is fed to the cables from the gate devices in such a way as to prevent interaction between pulses on different cables.

A disadvantage of the common pulse delay unit 11 described with reference to Figure 2 is that when two gate devices G1 to G500 are simultaneously brought into operation to receive a control pulse neither will be allotted a free channel until one is first rendered in-operative to receive control pulses. This means that neither of two subscribers S1 to S500 who lift their receivers simultaneously will be allotted a channel until one of them replaces his receiver.

The circuit arrangement shown in Figure 3 also gives complete protection against two gate devices G1 to G500 being allotted the same free-channel control pulse but does not suffer from the aforesaid disadvantage.

The circuit arrangement shown in Figure 3 represents a gate device G*xyz* of the gate devices G1 to G500, connected to three delay lines L*x*, L*y* and L*z* of the delay lines of Figure 2. The delay line L*x* is a delay line from the group C, the delay line L*y* is a delay line from the group D and the delay line L*z* is a delay line from the group U. Thus the schematic form of Figure 3 is less detailed than that of Figure 2. In a similar manner the other components associated with the groups C, D and U are given references including *x*, *y* and *z* respectively. Likewise, the two-gate *g*Y is one of the two-gates *g*D0 to *g*D9 and the two-gate *g*Z is one of the two-gates *g*U0 to *g*U9.

The arrangement represented in Figure 3 is in fact the same as that represented in Figure 2 except insofar as the omission of the gate 109 and the gates *gk*0 to *gk*9, and the addition of auxiliary circuits associated with the respective delay lines in the group C. In these auxiliary circuits each of the input leads *kc*0 to *kc*4 (see Figure 2) of the group C includes a two-gate corresponding to the two-gate *gkx'*. One of the inputs of the gate *gkx'* is connected to the input lead *kx* and its output is connected to the input of the delay line L*x*. The other input of the two-gate *gkx'* is connected to the output of a one-gate *gmx* having one of its two inputs connected to the output of the delay line L*x* and its other input connected to the output of a further two-gate *g*X. One of the inputs of hte two-gate *g*X is connected to a terminal TX, and the other input is connected to the common terminal 108 to which free-channel control pulses are applied in operation. It will be appreciated that the two-gate *g*X is one of five associated with the five delay lines L*c*0 to L*c*4 respectively and that the terminal TX is also one of five. Pulses of 100 microseconds duration having a cyclic period of 500 microseconds are cyclically applied to these five terminals represented by the terminal TX. These pulses are applied to those terminals from a control unit 9*a* which in this case forms part of the control apparatus 9.

Pulses of 100 microseconds duration having cyclic periods of 1100 microseconds and 1300 microseconds are applied as before, to the sets of terminals represented by TY and TZ respectively, from the control apparatus 9.

Pulse circulation may be set up in say the gate device G*xyz* by applying a control voltage to terminal 104. Control pulses appearing on the input branch leads *i*2 and *i*3 of the gate device G*xyz* from the output leads *my* and *mz* are passed by the gate 101'' and appear in the output branch leads *o*1, *o*2 and *o*3 and are fed to the delay lines L*y* and L*z* and to the gate *gkx'*. The control pulse appearing at the input of the gate *gkx'* is transmitted by this gate only if a control pulse from the terminal 108 is simultaneously transmitted by the gate *g*X to the other input of the two-gate *gkx'*, via the gate *gmx*.

Control pulses appear at both inputs of the gate *gkx'* only when 100 microsecond pulses appear simultaneously at terminals TX, TY and TZ. When this happens control pulses are fed through the three delay lines L*x*, L*y* and L*z* and through the associated gate device G*xyz* and are then continuously recirculated. Pulse circulation in the delay line L*x* is maintained by the passage of the pulses appearing at the output of the delay line L*x* through the gate *gmx* to the said other input of the two-gate *gkx'*.

As previously stated in relation to Figure 1, the appearance of a pulse at the output terminal 103 causes the control voltage applied to the terminal 104 to be removed. If the gate 101'' is caused to operate by the application of signals to the terminal 104 and leads *i*2 and *i*3 at a time when there is no signal at terminal TX, the appearance of a pulse at the terminal 103 will cause suppression of the control voltage at the terminal 104 and thus prevent continued circulation. The condition for the supperssion of the control voltage at terminal 104 will consequently not persist and this control voltage will subsequently reappear. This sequence of events will be repeated with any subsequent coincidences of 100 microsecond pulses at terminals TY and TZ until the coincidence of such signals occurs at terminals TX, TY and TZ when circulation will be continued.

It will be apparent that no two gate devices G1 to G500 can be allotted the same free channel since the conditions for starting continued circulation in the delay lines cannot simultaneously be appropriate to two or more gate devices G*xyz*.

In the circuit arrangements described with reference to Figures 2 and 3 the number of input and output leads equals the number of delay lines. In the arrangements shown in Figures 2 and 3, twenty-five input leads and twenty-five output leads are required, and since these leads need to be coaxial cables considerable economy may be effected if the number of input leads can be reduced.

In the circuit arrangement shown in Figure 4 only five input leads are employed. The form of representation used in this figure is the same as that used in relation to Figure 3, one of the five input leads being represented by *kx*.

With this arrangement the three-gates 101'' in the gate devices G1 to G500 are replaced by three-gates such as 101*a* having three inputs, an inhibiting terminal and two outputs. As before, one of the outptus is connected to the terminal 103. The other output is connected to a single output branch lead *ox* which is connected to the input lead *kx* associated with the delay line L*x*. The output of the delay line L*x* is connected as previously described by output lead *mx* and input branch lead *i*1 to the gate device G*yxz*. Thus it will be apparent that the output branch lead of each gate device G1 to G500 is connected to an input lead of the associated delay line in the first group of delay lines L*c*0 to L*c*4, that is to say, the group including the delay line L*x*. There are only five input leads such as *kx* corresponding to the leads *kc*0 to *kc*4 in Figure 2. The output branch lead (represented by the lead *ox*) from each of the gate devices G1 to G500 is connected to only one of the leads *kc*0 to *kc*4, the particular one of these leads depending upon which delay line in the group C forms part of the combination of three delay lines associated with that gate device.

The five input leads such as *kx* are connected to respective inputs of a five input one-gate 110' whose output is connected to an input of each of the gates in two groups of two-gates such as *gky* and *gkz*. The outputs of these two-gates are connected to the inputs respectively of the delay lines such L*y* and L*z* in the groups D and U. There are ten two-gates such as *gky* respectively associated with the delay lines L*d*0 to L*d*9, and ten two-gates such as *gkz* respectively associated with the delay lines L*u*0 to L*u*9.

The output of the delay line L*y* is connected to a one-gate *gy'*, connected in the manner of the gate *gy* hereinbefore described, but provided with a further output connected to the other input of the two-gate *gky*. The outputs and inputs of the other delay lines in the group C are similarly interconnected by connections from gates similar to the gate *gy'*, to gates similar to the gate *gky*. In the same manner, the outputs and inputs of the delay lines in the group U are interconnected through respective ones of ten one-gates such as the one-gate *gz'*. The further output of the gate *gz'* is connected to the other input of the two-gate *gkz* associated with the delay line L*z*.

The five input leads such as *kx* are also connected to respective inputs of a five input two-gate 109 the output of which is connected to an inhibitory input of the gate 110'.

In operation, control pulses are cyclically applied to the one-gates such as *gy'* and *gz'* from the gates GY and GZ. The gate device G*xyz*, say, is brought into operation by applying a control voltage to the terminal 104. When control pulses appear simultaneously in the input branch leads *i*2 and *i*3 and in the lead from the gate 107, the gate 101*a* responds and delivers an output pulse on the lead *ox*. This pulse is fed along the input lead *kx* to the delay line L*x* and to the one-gate 110' from which it is fed to the input of each of the two-gates such as *gky* and *gkz*. The only gates which receive control pulses at this instant are the gates *gky* and *gkz* and these gates open to transmit the pulse fed thereto from the gate 110.

If two or more of the gate devices G1 to G500 seize the same free-channel pulse that pulse is simultaneously applied to at least two of the inputs of two-gate 109. In such circumstances the resulting appearance of a pulse at the output of the gate 109 inhibits the application of pulses to the delay lines in the groups D and U. As a result complete protection is given against two or more line terminating units LT1 to LT500 seizing the same communication channel.

The construction of the common pulse delay unit 10 referred to in connection with Figure 1 may be the same in basic principle to that of the unit 11. One form of this unit 10 will now be described with reference to Figure 5 in which the schematic form of representation used is similar to that used in Figures 3 and 4.

Referring to Figure 5, six delay lines such as the delay lines L*x*, L*y* and L*z*, are connected at their outputs to the respective output leads m1 to m6, three of which are represented in this figure by the leads mx, my and mz. The delay lines each have a delay time of 100 microseconds, and each of the output leads m1 to m6 includes a one-gate such as the one-gates gx', gy' and gz'. Each of the one-gates has two inputs, an inhibitory input and two outputs. A first of the two inputs and a first of the two outputs of each one-gate is connected in the respective one of the output leads m1 to m6, the second input of each one-gate being connected to a respective one of the terminals T1 to T6. Three of the terminals T1 to T6 are represented in this figure by terminals Tx, Ty and Tz.

The inhibitory input of each of the one-gates such as the one-gates gx', gy' and gz', is connected to the terminal 106.

The input branch leads i1, i2 and i3 of the twenty gate devices such as the gate devices G'1 to G'2 shown in Figure 1 are connected to different combinations of three of the output leads m1 to m6. One only of these gate devices, the gate device G'xyz, is shown in Figure 5.

Each of the twenty gate devices such as G'xyz is formed by a three-gate 101'a which has three inputs and two outputs. The three leads i1, i2 and i3 of each gate device are connected to respective inputs of the gate 101'a, and the two outputs of that gate are respectively connected to the terminal 103 and the output branch lead ox of that gate device.

The output branch leads ox of the twenty gate devices such as G'xyz are connected to the common input lead k of the unit 10. This lead k is connected in the unit 10 to one of two inputs of each of six two-gates such as gkx, gky and gkz, by means of six leads such as kx, ky and kz.

The output of each of the two-gates such as gkx, gky and gkz is connected to the input of a respective one of the delay lines such as Lx, Ly and Lz, whereas the other input of that two-gate is connected to the second output of the one-gate such as gx', gy' and gz', which is connected to the output of that particular delay line.

In operation pulse circulation may be set-up in the gate device G'xyz for example, by applying a ½ microsecond control pulse simultaneously to the three terminals Tx, Ty and Tz. The resulting pulses which appear simultaneously on the input branch leads i1, i2 and i3 of the gate device G'xyz causes a pulse to be applied from that gate device to the terminal 103 and over the lead ox to the lead k.

This pulse applied to the lead k is applied simultaneously to each of the two-gates such as gkx, gky and gkz. The only ones of these two-gates which respond to this pulse are those to which that pulse is also applied from the respective one-gates such as gx', gy' and gz'. In the present case the application of the ½ microsecond control pulse simultaneously to each of the terminals Tx, Ty and Tz causes pulses to be applied to the two-gates gkx, gky and gkz from the one-gates gx', gy' and gz' simultaneously with the application of pulses to those two-gates from the lead k. Since the control pulse is applied to only the three terminals Tx, Ty and Tz there is no corresponding application of pulses simultaneously to both inputs of any of the other two-gates. Thus pulses are applied simultaneously to the inputs of the three delay lines Lx, Ly and Lz but not to the inputs of any of the other delay lines. Pulse circulation is therefore set-up in the combination of delay lines Lx, Ly and Lz, the phase of the resulting train of pulses appearing at the output terminal 103 of the gate device Gxyz being determined by the position in time of the control pulse originally applied to the terminals Tx, Ty and Tz. The pulse recurrence period of this pulse train is of course 100 microseconds and the pulses each have a duration of ½ microsecond.

The appearance of a pulse train in any other phase at the output terminal 103 of any other gate device such as G'xyz may be obtained by applying a ½ microsecond control pulse in an appropriate time position to the appropriate combination of three of the terminals T1 to T6. Further, the appearance of a pulse train in any particular phase may be stopped simply by applying to the terminal 106 a pulse having a position in time which is the same as the position in time of a pulse in that pulse train. This inhibits the circulation, and therefore recirculation, of pulses in that time position through all the one-gates such as gx', gy' and gz', but does not of course interfere with the circulation of pulses in other time positions.

Figure 6:
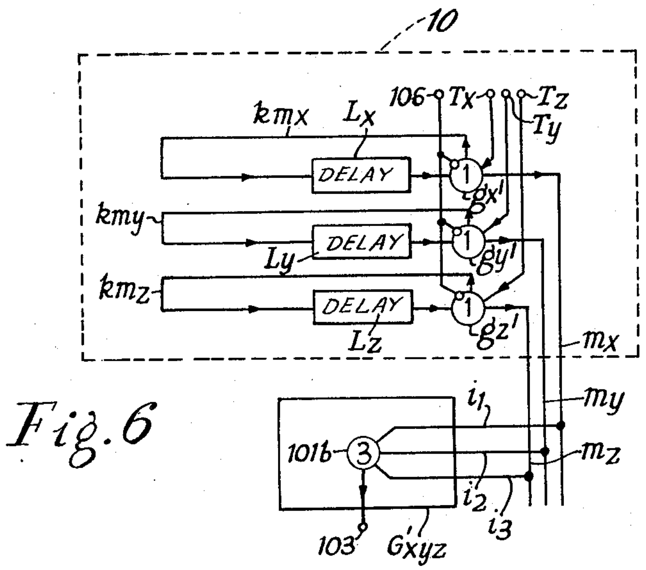
Figure 6 is a block schematic diagram of an alternative form of circuit arrangement according to the present invention, which may replace the circuit arrangement of Figure 5 in the system shown in Figure 1.

An alternative circuit arrangement to that described with reference to Figure 5, for use in the unit 10 is represented in Figure 6. With this circuit arrangement no input lead k is required.

Referring to Figure 6, the outputs of six delay lines such as Lx, Ly and Lz, are connected to a first input of associated one-gates such as gx', gy' and gz'. The delay lines each have a delay time of 100 microseconds and each of the one-gates has two inputs, an inhibitory input, and an output. The second input of each one-gate is connected to a respective one of the terminals T1 to T6 only three of which, terminals Tx, Ty and Tz, are represented in this figure. The inhibitory inputs of the six one-gates are all connected to the terminal 106.

One output of each of the one-gates such as gx', gy' and gz', is connected over a respective lead such as kmx, kmy and kmz, to the input of the delay line associated with that particular one-gate. The other output of each one-gate is connected to a respective one of the output leads m1 to m6. Three only of these output leads are represented in this figure by leads mx, my and mz.

Each of the twenty gate devices such as G'xyz is formed by a three-gate 101b which has three inputs and one output. The three input branch leads i1, i2 and i3 of each gate device are connected to respective inputs of the gate 101b, and the output of that gate is connected to the terminal 103 of that gate device.

In operation a ½ microsecond control pulse applied to the combination of three terminals Tx, Ty and Tz for example, causes pulses to be applied simultaneously over the leads kmx, kmy and kmz to the inputs of the delay lines Lx, Ly and Lz. Circulation of these pulses through the delay lines Lx, Ly and Lz is thereby set-up, a pulse recurring at intervals of 100 microseconds at the output of each of the delay lines Lx, Ly and Lz. These pulses appearing at the outputs of the delay lines Lx, Ly and Lz are applied simultaneously over the leads mx, my and mz to the input branch leads i1, i2 and i3 of the gate device G'xyz. As a result a train of pulses appears at the output terminal 103 of the gate device G'xyz, the pulse recurrence period of this pulse train being 100 microseconds and the duration of each pulse being ½ microsecond. The phase of this pulse train is of course determined by the position in time of the control pulse applied to the terminals Tx, Ty and Tz.

The appearance of a pulse train in any other phase at the output terminal 103 of any other gate device such as G'xyz may be obtained by applying a ½ microsecond control pulse in an appropriate time position to the appropriate combination of three of the terminals T1 to T6. Further, the appearance of a pulse train in any particular phase may be stopped simply by applying to the terminal 106 a pulse having a position in time which is the same as the position in time of a pulse in that particular pulse train.

The construction of the various gates employed in the circuit arrangements hereinbefore described will be readily understood by those skilled in the art. References to the constructions of two input two-gates and three input three-gates have been given.

Figure 7:
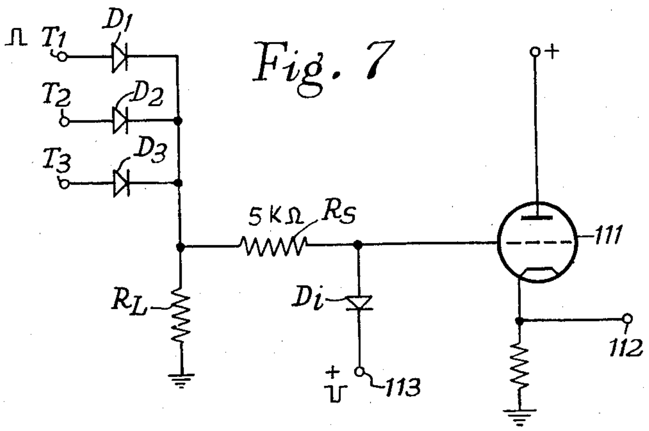
Figure 7 is a circuit diagram of a three input one-gate suitable for use in the system shown in Figure 1.

For completeness, a one-gate having say three inputs and one output may simply comprise three input terminals, uni-directional current paths connecting the input terminals to one end of a common load resistor whose other end may be earthed, and an output terminal connected to the said one end of the load resistor. In the case where means for inhibiting the transmission of pulses through the one-gate are required, a three input one-gate such as that shown in Fig. 7 may be employed. Positive-going ½ microseconds pulses appearing at any one of input terminals $T_1$ to $T_3$, for example the input terminal $T_2$, are fed through the associated diode $D_2$ and appears across load resistor $R_L$. These pulses are fed to the control grid of a cathode follower valve 111 through a 5 kΩ resistor $R_S$, positive-going output pulses appearing at output terminal 112 connected to the cathode of the valve 111. Negative-going ½ microseconds inhibiting pulses may be applied to inhibiting terminal 113 to open diode $D_1$, which is connected to the control grid of the valve 111. Pulses occurring simultaneously with the inhibiting pulses applied to terminal 113 are thereby shunted through the diode $D_1$ and do not appear at the output terminal 112. It will be apparent to those skilled in the art that a two-input one-gate may be provided simply by employing only two input terminals $T_1$, $T_2$ and associated diodes $D_1$ and $D_2$ in the circuit shown in Fig. 7, and that a five or six input one-gate may be obtained simply by providing two or three additional input terminals, say terminals $T_4$ and $T_5$ or $T_4$, $T_5$ and $T_6$ as the case may be, together with associated diodes $D_4$ and $D_5$ or $D_4$, $D_5$ and $D_6$, in the circuit shown in Fig. 7.

Figure 8:
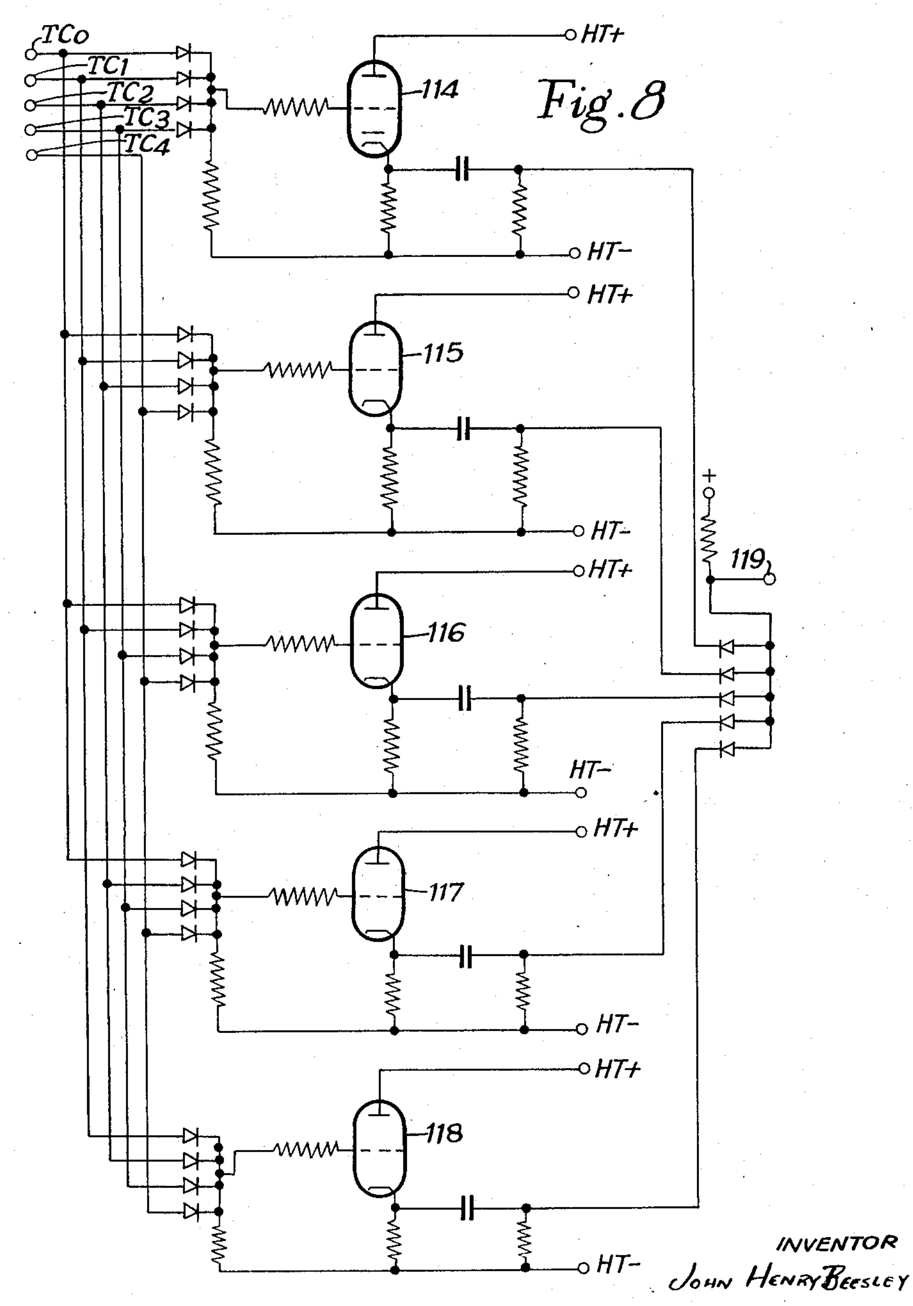
Figure 8 is a circuit diagram of a five input two-gate suitable for use in that system.

A circuit suitable for use as a five input two-gate hereinbefore referred to is shown in Fig. 8. The circuit comprises five triode valves 114, 115, 116, 117 and 118. The control electrode of each of these valves is connected through a resistor to the common connection of a group of four parallel-connected input diodes. The other sides of the input diodes are connected in the manner shown to five input terminals $TC_0$, $TC_1$, $TC_2$, $TC_3$ and $TC_4$. The cathode of each valve is connected through a capacitor and an output diode to an output terminal 119. For the purpose of the description of the operation of the circuit shown it will be assumed that a positive-going pulse appears at input terminal $TC_2$. The pulse appearing at this terminal is fed through the third input diode in the first group to the control electrode of the valve 114, which in response thereto produces a positive pulse at its cathode. The same positive pulse at terminal $TC_2$ in like manner appears at the control electrodes of the valves 115, 117 and 118, causing positive pulses to appear at the cathodes of these valves also. The positive bias applied to the anodes of the output diodes is such that in the absence of any input pulses at the input terminals $TC_0$, $TC_2$, $TC_3$ and $TC_4$, the output diodes are all conducting. The positive pulse appearing at the cathode of each of the valves 114, 115, 117 and 118 due to the input pulse at terminal $TC_2$ renders the output diodes associated with these four valves non-conducting. The output diode associated with the valve 116, however, remains conducting and no output pulse is produced at the output terminal 119. When however two input pulses appear simultaneously at two of the input terminals $TC_0$—$TC_4$ all five output diodes are rendered non-conducting for the period of coincidence of the input pulses and a positive-going output pulse is produced at the output terminal 119. For example, when two pulses appear simultaneously at the input terminals $TC_2$ and $TC_3$, the pulse fed to the terminal $TC_2$ causes the output rectifiers associated with the valves 114, 115, 117 and 118 to become non-conducting as hereinbefore described and the pulse appearing at the input terminal $TC_3$ causes the output rectifier associated with the valve 116 also to become non-conducting. Thus, an output pulse appears at the output terminal 119.

The construction of a six input two-gate may readily be developed from the circuit shown in Fig. 8. The inhibiting means shown in Fig. 7, comprising the resistor $R_S$, diode $D_1$, cathode following 111 and inhibiting terminal 113 may, where necessary, be incorporated in the output circuit of any of the gate circuits herein described.

I claim:

1. An electrical circuit arrangement for generating at different ones of a plurality of outputs different ones of a plurality of time interlaced pulse trains, comprising a plurality of gating means, each gating means having a plurality of inputs and an output and being responsive to the concurrent application of pulses to all of its said inputs to supply a pulse at its said output, a plurality of delay devices each having an input and an output, there being fewer delay devices than gating means, circuit means which for each gating means connects the different inputs of such gating means to the outputs of a singular associated combination of different delay devices, said circuit means connecting different ones of said gating means to different singular associated combinations of said delay devices, further circuit means connected to the inputs of the delay devices to pass pulses to the inputs of the delay devices in any one of said combinations when pulses appear concurrently at the outputs of the delay devices in such one combination, and starting means operable to apply pulses to the inputs of any said delay devices.

2. An electrical circuit arrangement for generating at different ones of a plurality of outputs different ones of a plurality of time interlaced pulse trains, comprising a plurality of gate devices, each gate device having a plurality of inputs and an output and being responsive to the concurrent application of pulses to all of its said inputs to supply a pulse at its said output, a plurality of delay devices each having an input and an output, there being fewer delay devices than gate devices, first circuit means which for each gate device connects the different inputs of such gate device to the outputs of a singular associated combination of different delay devices, said circuit means connecting different ones of said gate devices to different singular associated combinations of said delay devices, second circuit means connecting the outputs of said gate devices to the inputs of said delay devices, said second circuit means connecting the output of each gate device to the same combination of delay devices as is connected to the inputs of that gate device by said first circuit means, and selectably operable means to apply a pulse to the inputs of the delay devices in any one of said combinations.

3. An electrical circuit arrangement according to claim 2 wherein the plurality of delay devices are in a plurality of groups with each of those delay devices included in one, and only one, of those groups, each of said combinations of delay devices including one, and only one, of the delay devices from a first of said plurality of groups, gating means having a plurality of inputs that are connected to the outputs of the gate devices respectively and an output, said gating means being responsive to the concurrent appearance of pulses at the outputs of any two of said gate devices to supply an output pulse, means connected between the outputs of said gate devices and the inputs of the delay devices respectively in said first group to pass pulses from those gate devices to those delay devices, the last-said means being responsive to the appearance of a pulse at the output of said gating means to inhibit the passage of pulses from said gate devices to the delay devices in said first group.

4. An electrical circuit arrangement according to claim 3 wherein the selectably operable means comprises a plurality of starting means each of which is operable to apply a pulse to one of the inputs in a respective one of the gate devices, and means for applying pulses to all the other inputs of said gate devices.

5. An electrical circuit arrangement according to claim 4 wherein each gate device includes respective inhibiting means operable to inhibit the supply of an output pulse by that gate device.

6. An electrical circuit arrangement for generating at different ones of a plurality of outputs different ones of a plurality of time interlaced pulse trains, comprising a plurality of gate devices each having a plurality of inputs and an output and being responsive to the concurrent application of pulses to all of those inputs to apply a pulse to that output, a plurality of groups of delay devices each group of which comprises a plurality of delay devices and each delay device of which has an input and an output and is included in only one of said groups, there being fewer delay devices than gate devices, first circuit coupling means grouping said delay devices into a plurality of different combinations of delay devices with each of said gate devices associated with a respective one of said combinations, each of said combinations including one, and only one, of the delay devices from a first of said groups, said first circuit coupling means coupling the different inputs of each said gate device to the outputs of the different delay devices in the combination of delay devices associated with that gate device, second circuit coupling means responsive to the appearance of a pulse at the output of any one of said gate devices to apply a pulse to the input of that one of the delay devices in said first group which is also included in the combination of delay devices associated with said one gate device, coincidence means responsive to the concurrent appearance of a pulse at the output of any one of the delay devices included in any except said first of said groups and at the output of any of said gate devices to apply a pulse to the input of this said one delay device, and selectably operable means to apply a pulse to the inputs of the delay devices in any one of said combinations.

7. An electrical circuit arrangement according to claim 6 wherein said coincidence means comprises a plurality of gates, there being one such gate individually associated with each delay device included in any except said first of said groups, and each of these gates having a first input and a second input and being responsive to the concurrent application of a pulse to its first and second inputs to apply a pulse to the input of the delay device with which that gate is associated, circuit means for each of said plurality of gates responsive to the appearance of a pulse at the output of the delay device with which this gate is associated to apply a pulse to said first input of that gate, and further circuit means responsive to the appearance of a pulse at the output of any of said gate devices to apply a pulse to said second input of each of said plurality of gates.

8. An electrical circuit arrangement according to claim 7 wherein said further circuit means includes inhibiting means having an inhibiting input and which is responsive to the application of a pulse to that inhibitory input to inhibit the application by that further circuit means of pulses to the second inputs of said plurality of gates, and wherein gating means is responsive to the concurrent appearance of pulses at the outputs of any two of said gate devices to apply a pulse to said inhibitory input.

9. An electrical circuit arrangement according to claim 8 wherein said selectably operable means comprises means to apply a pulse concurrently to all except an excepted one of said inputs of each gate device and to apply this pulse to said gate devices in sequence, and a plurality of starting means each of which is selectably operable to apply a pulse to said excepted one of the inputs of a respective one of the gate devices.

10. An electrical circuit arrangement for generating at different ones of a plurality of outputs different ones of a plurality of time interlaced pulse trains, comprising a plurality of gate devices each having a plurality of inputs and an output and being responsive to the concurrent application of pulses to all of those inputs to apply a pulse to that output, a plurality of groups of delay devices each group of which comprises a plurality of delay devices and each delay device of which has an input and an output and is included in only one of said groups, there being fewer delay devices than gate devices, first circuit coupling means grouping said delay devices into a plurality of different combinations of delay devices with each of said gate devices associated with a respective one of said combinations, each of said combinations including one, and only one, of the delay devices from a first of said groups, said first circuit coupling means coupling the different inputs of each said gate device to the outputs of the different delay devices in the combination of delay devices associated with that gate device, second circuit coupling means responsive to the appearance of a pulse at the output of any one of said gate devices to apply a pulse to the input of each delay device in any except said first of said groups which is also included in the combination of delay devices associated with said one gate device, coincidence means responsive to the concurrent appearance of a pulse at the output of any one of said gate devices and at the output of the delay device in said first group which is included in the combination of delay devices associated with that said one gate device to apply a pulse to the input of that particular delay device, and selectably operable means to apply a pulse to the inputs of the delay devices in any one of said combinations.

11. An electrical circuit arrangement according to claim 10 wherein said coincidence means comprises a plurality of gates, there being one such gate individually associated with each delay device included in said first group, and each of these gates having a first input and a second input and being responsive to the concurrent application of a pulse to its first and second inputs to apply a pulse to the input of the delay device with which that gate is associated, circuit means for each of said plurality of gates responsive to the appearance of a pulse at the output of the delay device with which this gate is associated to apply a pulse to said first input of that gate, and further circuit means for each said gate device responsive to the appearance of a pulse at the output of that gate device to apply a pulse to said second input of one of said plurality of gates, this one of said gates being that which is associated with the delay device of said first group which is included in the combination of delay devices associated with this said gate device.

12. An electrical circuit arrangement according to claim 11 wherein said selectably operable means comprises means to apply a pulse concurrently to all except an excepted one of said inputs of each gate device and to apply this pulse to said gate devices in sequence, means to apply this last-mentioned pulse to said first inputs of said plurality of gates in sequence, and a plurality of starting means each of which is associated with an individual one of said gate devices, each starting means being selectably operable to apply a pulse to said excepted one of the inputs of the gate device with which that starting means is associated.

13. An electrical circuit arrangement for generating at different ones of a plurality of outputs different ones of a plurality of time interlaced pulse trains, comprising a plurality of gate devices, each having a plurality of inputs and an output and being responsive to the concurrent application of a pulse to all of those inputs to apply a pulse to that output, a plurality of delay devices each having an input and an output, there being fewer delay devices than gate devices, circuit coupling means grouping said delay devices into a plurality of different combinations of delay devices with each of said gate devices associated with a respective one of said combinations, said first circuit coupling means coupling the different inputs of each said gate device to the outputs of the different delay devices in the combination of delay devices associated with that gate device, coincidence means responsive to the concurrent appearance of a pulse at the output of any one of said delay devices and at the output of any of said gate devices to apply a pulse to the input of said one delay devise, and selectably operable means to apply a pulse to the inputs of the delay devices in any one of said combinations.

14. An electrical circuit arrangement according to claim 13 wherein said coincidence means comprises a plurality of gates, there being one such gate individually associated with each of said plurality of delay devices, and each of these gates having a first input and a second input and being responsive to the concurrent application of a pulse to its first and second inputs to apply a pulse to the input of the delay device with which that gate is associated, circuit means for each of said plurality of gates responsive to the appearance of a pulse at the output of the delay device with which this gate is associated to apply a pulse to said first input of that gate, and further circuit coupling means common to all of said gate devices responsive to the appearance of a pulse at the output of any of said gate devices to apply a pulse to said second inputs of all of said plurality of gates.

15. An electrical circuit arrangement according to claim 14 wherein said selectably operable means comprises means to apply a pulse concurrently to said first inputs of the gates of said plurality of gates which are associated with a delay device in said one combination of delay devices, and means to apply this pulse also concurrently to all the inputs of the gate device which is associated with said one combination.

16. An electrical circuit arrangement for generating at different ones of a plurality of outputs different ones of a plurality of time interlaced pulse trains, comprising a plurality of gate devices each having a plurality of inputs and an output and being responsive to the concurrent application of pulses to all of those inputs to apply a pulse to that output, a plurality of delay devices each delay device of which has an input and an output, there being fewer delay devices than gate devices, first circuit coupling means grouping said delay devices into a plurality of different combinations of delay devices with each of said gate devices associated with a respective one of said combinations, said first circuit coupling means coupling the different inputs of each gate device to the outputs of the different delay devices in the combination associated with that gate device, second circuit coupling means for each delay device of said plurality of delay devices responsive to the appearance of a pulse at the output of this delay device to apply a pulse to the input of that delay device, and means selectably operable to apply a pulse to the input of each delay device in any one of said combinations.

References Cited in the file of this patent

UNITED STATES PATENTS

| | | |
|---|---|---|
| 2,490,833 | Ransom | Dec. 13, 1949 |
| 2,495,740 | Labin et al. | Jan. 31, 1950 |
| 2,627,553 | Levy et al. | Feb. 3, 1953 |
| 2,657,253 | Bedford | Oct. 27, 1953 |
| 2,672,517 | Broughtwood | Mar. 16, 1954 |
| 2,773,934 | Trousdale et al. | Dec. 11, 1956 |